United States Patent [19]

Lasker et al.

[11] 4,322,984
[45] Apr. 6, 1982

[54] GYROSCOPE CAGE SYSTEM FOR HIGH G ENVIRONMENTS

[75] Inventors: George Lasker, Claremont; Paul G. Redman, Upland, both of Calif.

[73] Assignee: General Dynamics, Pomona Division, Pomona, Calif.

[21] Appl. No.: 94,406

[22] Filed: Nov. 15, 1979

[51] Int. Cl.³ ............................................. G01C 19/24
[52] U.S. Cl. ........................................ 74/51; 74/5.12; 74/5.22
[58] Field of Search ...................... 74/5.1, 5.12, 5.14, 74/5.2, 5.22

[56] References Cited

U.S. PATENT DOCUMENTS 3,992,955 11/1976 Evans ................................. 74/5.12

Primary Examiner—Donald P. Walsh
Attorney, Agent, or Firm—Neil F. Martin; Freling E. Baker; Edward B. Johnson

[57] ABSTRACT

A gyroscope caging system includes a clamping ring encircling a portion of the rotor of the gyro and adapted to engage an annular groove in the rotor simultaneously with engagement of a groove in a base support member, for clamping to and supporting the rotor during very high acceleration launches of a missile or airborne vehicle. The caging system is adapted to preload the gyroscope bearings in order to insure that the maximum load is carried by the cage device.

7 Claims, 6 Drawing Figures

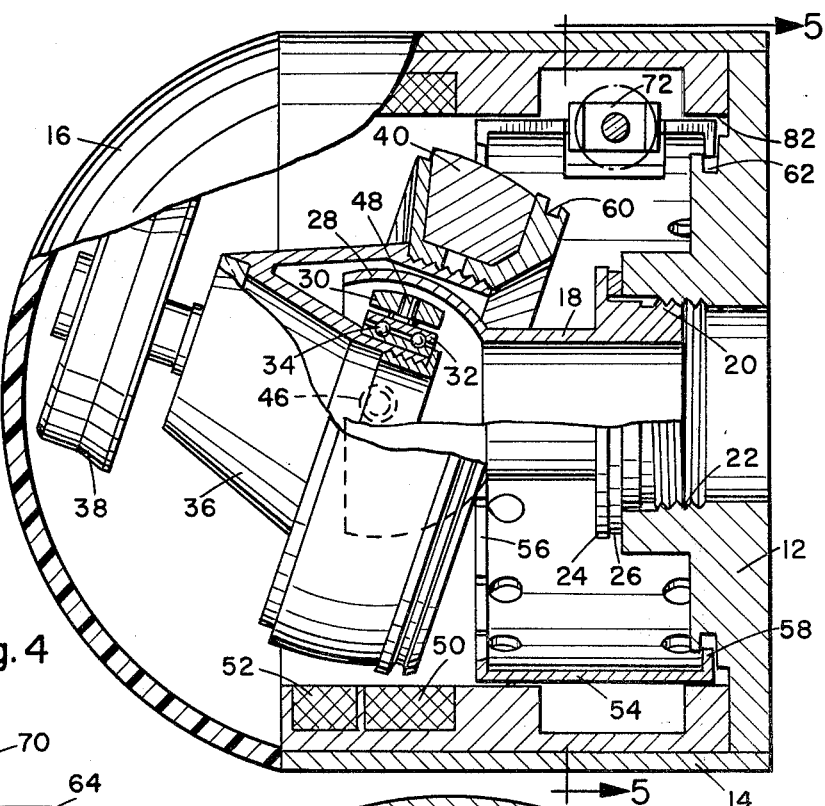
Fig. 4
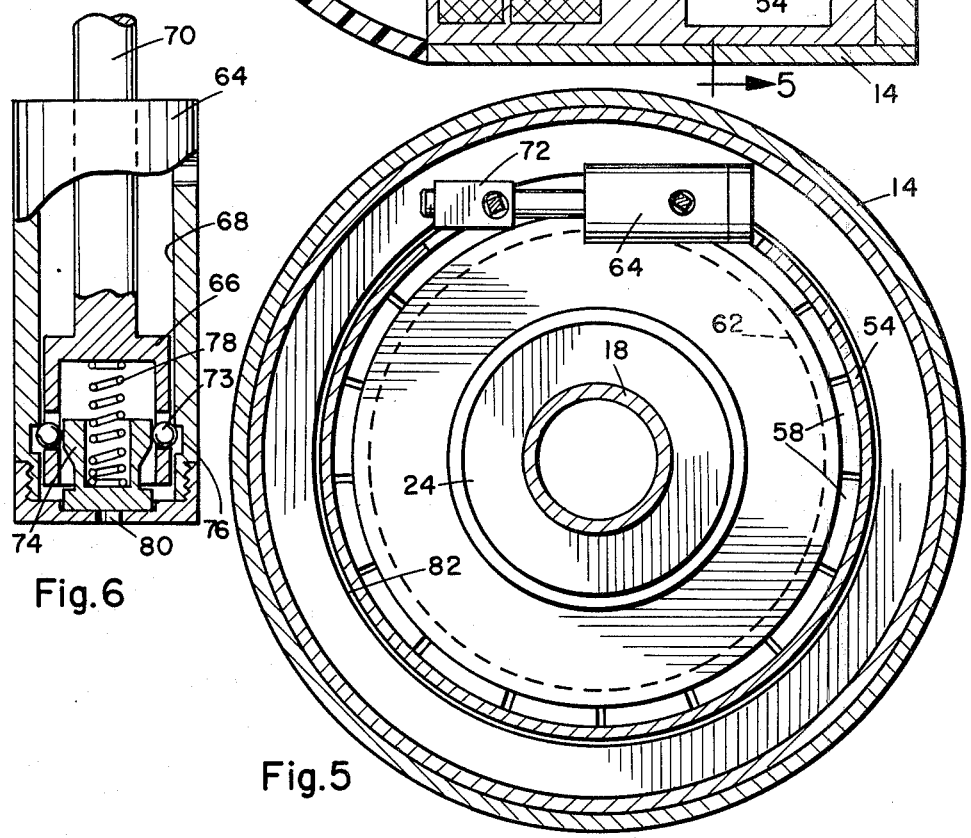
Fig. 6
Fig. 5

GYROSCOPE CAGE SYSTEM FOR HIGH G ENVIRONMENTS

BACKGROUND OF THE INVENTION

The present invention relates to gyroscopes and pertains particularly to a caging system for caging the gyro for high acceleration loads.

It is known to cage gyroscopes under certain conditions. Such caging is normally affected by locking the gimbals of the gyroscope to prevent movement thereof during transportation or other handling or reorientation of the gyroscope.

It is also desirable to cage the gyroscopes in missiles and other airborne vehicles during initial launch in order to maintain proper orientation thereof, as well as to reduce the possible damage to the parts of gyroscope during high acceleration launch.

Missiles having any form of guidance control normally employ gyroscopes in the control system. The gyroscopes employ very delicate precision bearings to ensure accuracy during their operation. The bearings of gyroscopes, particularly the spin bearings and gimbal bearings, can become damaged during a high acceleration launch environment. In gun launched missiles the initial acceleration can be on the order of 10,000 g or even higher. The prior art approach to gyro caging is ineffective to prevent damage to the bearings under such conditions.

It is therefore desirable that some means or system be available which will prevent damage to the gyroscope bearing during very high acceleration launch.

SUMMARY AND OBJECTS OF THE INVENTION

It is therefore the primary object of the present invention to overcome the above problems of the prior art.

Another object of the present invention is to provide an improved caging system for gyroscopes which prevent damage to the bearings during launch of a vehicle in which the gyroscope is employed.

A further object of the invention is to provide an improved cage system which locks the rotor of a gyroscope during high acceleration launching to prevent damage to the bearings in the gyroscope.

In accordance with the primary aspect of the present invention a cage system includes an annular lock which encircles a portion of the rotor of the gyroscope and simultaneously calmps the rotor to the bulk head support and preloads the gyroscope bearings in order to support the rotor mass during high acceleration launch to prevent damage to the bearings.

BRIEF DESCRIPTION OF THE DRAWINGS

The above and other objects and advantages of the present invention will be apparent from the following description when read in conjunction with the drawings, wherein:

FIG. 4 is a view like FIG. 1 showing the cage assembly disengaged and the gyroscope precessed.

FIG. 5 is a view taken generally on line 5—5 of FIG. 4.

FIG. 6 is an enlarged detailed view, partially in section, showing the details of the actuating and locking mechanism.

DETAILED DESCRIPTION OF A PREFERRED EMBODIMENT

Figure 1:
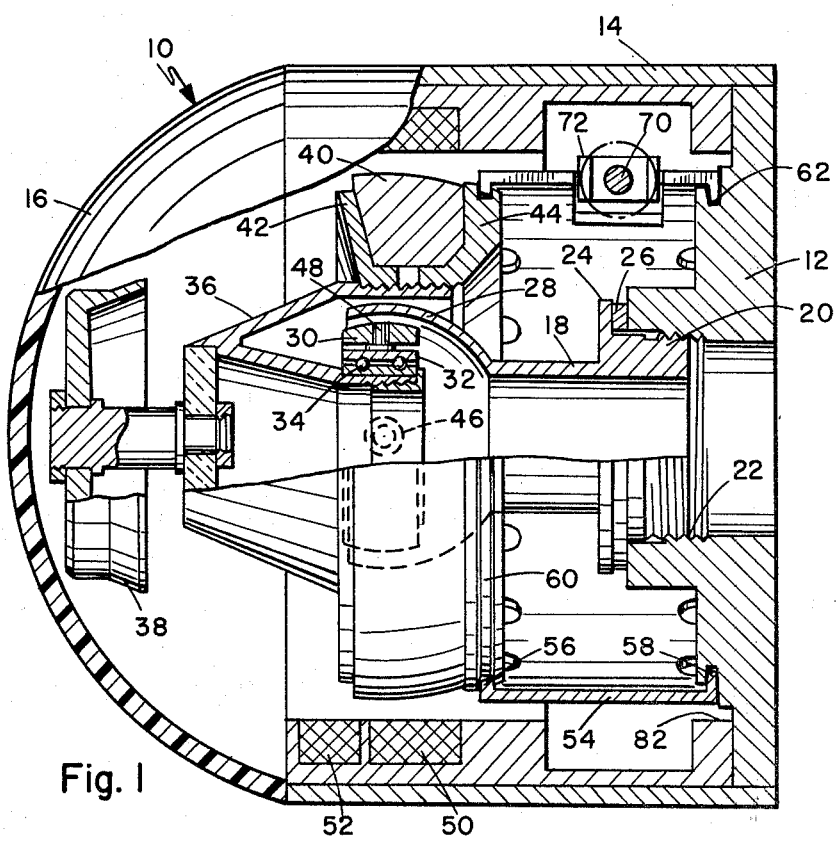
FIG. 1 is a side elevation view, partially in section, of a preferred embodiment of the invention.

Turning to FIG. 1 of the drawing, there is illustrated a gyroscope assembly in accordance with the invention which is housed in a housing assembly which is mounted on an air frame and may constitute, for example, the nose cone of a missile or the like. It is assumed for the purpose of this discussion that the housing consists of or constitutes a nose cone of a missile or the like which undergoes very high acceleration forces during launch, such as from a gun. The assembly as illustrated in FIG. 1 is designated generally by the numeral 10 and comprises a bulkhead member 12 with a housing member 14 of a generally cylindrical configuration, defining the outer covering of a housing having a generally hemispherical nose member 16. Mounted within this housing is a gyroscope which includes a gyro support post 18 secured to the bulkhead 12 by means of a threaded plug member 20, which engages a threaded bore or portion of a bore 22 in the bulkhead. The support post 18 includes a shoulder 24 which cooperatively engages a shim 26 between the shoulder and an annular portion of the bulkhead 12.

The gimbal or gyro support post 18 includes a generally bell shaped portion 28 in which is pivotally mounted a gimbal ring 30, which in turn supports an inner gimbal ring 32. The inner gimbal ring 32 supports the spin bearings 34 of the gyroscope rotor.

The rotor includes an assembly 36 having a tracking head or the like 38 mounted in a forwardmost portion thereof. A rotor mass 40 of an annular configuration is mounted on the hub 36 by suitable means, such as a rim or flange 42 and a rim or flange 44.

The rotor has 2 degrees of freedom relative to the rotary axis. These degrees of freedom are provided by the pivot mountings of the gimbals. The outer gimbal 30 includes a pivot axis 46 and the inner gimbal 32 pivots about a gimbal axis or trunion supports 48 (only one of which is shown). Electrical coils 50 and 52 surround the rotor for rotor drive, deflection, pickup and the like.

Figure 2:
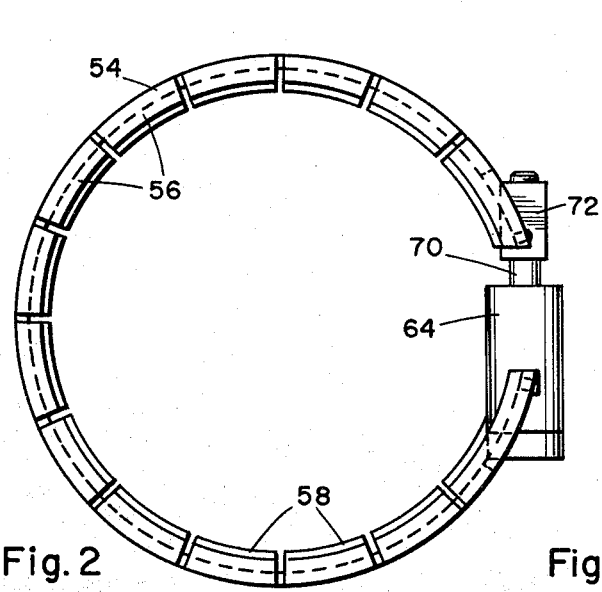
FIG. 2 is an end view of the cage ring.
Figure 3:
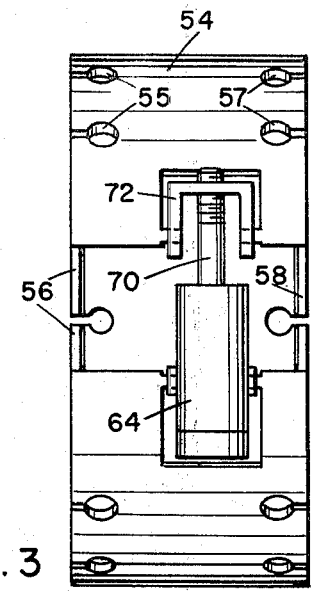
FIG. 3 is a side view of the cage ring showing the lock actuating mechanism.

A caging mechanism for caging the gyro during high acceleration launch includes a cage ring 54 which surrounds a portion of the rotor engaging the flange 44 and the bulkhead member 12 for retaining the rotor in position during launch. This cage ring, as also seen in FIGS. 2 and 3, is split and includes a plurality of downwardly extending teeth 56 on one end which engage the rotor, and a plurality of similar teeth 58 on the other end which engages the bulkhead. These teeth are substantially wedge shaped and engage a similarly shaped groove 60 in the flange 44 and a groove 62 in the bulkhead 12.

The cage ring 54 is moved to its engaged and disengaged positions by means of a linear actuator 64. The actuator may be either hydraulic or air actuated, but is preferably air actuated. The actuator, as best seen in FIG. 6, includes a piston 66 within a cylindrical bore 68, having a piston rod 70 which is adjustably connected by a bracket member 72 to one side of the split ring. The cylinder housing is connected to the other side of the split ring. Actuation of the cylinder pulls the sides or ends of the rings together into the clamping position. A locking mechanism as best seen in FIG. 6 locks the assembly in the engaged or caged position until released. The locking mechanism includes one or more ball elements 73 carried in slots in the piston 66 and cammed by means of a cylindrical cam 74 into an annular recess 76 within the cylinder 68. A spring 78 biases the cam 74 into the locked position for holding the ball elements 73 into the locking position. The locking mechanism is disengaged by an introduction of fluid pressure into port 80 against the piston face of the cam member 74 for forcing the cam member backwards for releasing the locking elements 72. The cage ring is then released to expand to its disengaged or unlocked position, as shown in FIG. 4.

As will be appreciated when viewed in FIG. 4, the cage ring 54 is provided with stop means in the form of an annular shoulder 82 which is engaged by the ring upon expanding to prevent the teeth 58 from completely disengaging from the slot 62 upon disengagement of the teeth 58 from the rotor groove 60. The cage ring is thus retained in axial position in the housing to prevent interference with normal operation of the gyro.

The above described mechanism engages and supports the rotor of the gyro directly rather than engaging and supporting the gimbals of the gyro as in the prior art devices. This support, when properly adjusted, relieves the forces on the gimbal and spin bearings during high g launching of a vehicle.

The present caging system is designed to provide substantial support for the rotor to prevent permanent damage to the gimbal and spin bearings. This is accomplished through the control and design around two critical parameters, these being support stiffness and bearing preload. The support stiffness, that is of the ring, determines how much rotor load is sustained by the spin and gimbal bearings. With this in mind, the cage ring 54 which acts as the support is designed to have maximum stiffness in its axial direction, yet at the same time have minimum weight. The ring is formed as best seen in FIG. 3, with a plurality of bore and slot combinations 55 and 57 spaced around the edge of the ring forming the separation of the teeth. This construction provides a flexibility for radial expansion and contraction of the cage ring and at the same time reduces weight or mass of the ring without affecting its axial stiffness.

Bearing preload adjusts or tunes the bearing load to ensure against deformation of the bearings from the inertial load. This is carried out by tuned stiffness concept to be described. The rotor support is provided by the cage ring 54 for a substantial portion of the inertial load of the rotor. A minor portion of the rotor load is shared by the bearings.

Additional mass within the system which is subjected to inertia is the gyro gimbal. This gyro gimbal mass or inertial load is shared by the gimbal and spin bearings. The amount of the load sustained by this spin and gimbal bearing due to the rotor and gimbal inertial load is minimized by using a "tuned stiffness" concept. The stiffness of the cage ring will determine how much of the rotor load is shared between the spin and gimbal bearings and the cage ring. The bearing loads will vary as the function of the cage spring stiffness for a constant 10,000 g launch acceleration. As the cage ring stiffness increases, the spin bearing load changes from a plus to a minus. This is actually a shift in load from the forward to the aft bearings which make up the spin bearing pair. This selecting or tuning of the cage ring stiffness optimizes the bearing loads.

Another parameter which can be used in optimizing the bearing loads is the rotor preload. This preloading is implemented by introducing an adjustable element such as shim 26, as previously described in the system, so that the rotor position can be adjusted relative to the cage spring. By monitoring the load through the spring mass system using strain gages on the gyro support post 18, the rotor may be positioned to produce the desired preload. The cage spring stiffness should be optimized to minimize the bearing loads. As the cage spring rigidity is increased, special materials and heavy sections may be required.

The shim 26 acts to precisely locate the groove 60 axially with respect to groove 62, thus eliminating the need for a critical machined end dimension between the bulkhead and the rotor grooves. This shim also precisely locates the grooves relative to the cage ring teeth to ensure the proper gyro preload. The preload is preferably determined by the use of strain gages on the support post 18.

While we have illustrated and described our invention by means of specific embodiments, it is to be understood that numerous changes and modifications may be made therein without departing from the spirit and scope of the invention as defined in the appended claims.

Having described our invention, we now claim:

1. A gyro cage system for supporting a gyro rotor during high g launch of an airborne vehicle, said cage comprising: annular clamping means for surrounding a portion of a gyro rotor for engaging and supporting said rotor and including preloading means for preloading the gyro rotor support bearings, said clamping means being movable between engaged and disengaged positions whereby the rotor is alternately held against rotation and free to rotate; and
   actuating means for selectively moving said clamp between said engaged and said disengaged positions.

2. The gyro cage of claim 1, wherein the clamping means is adapted to engage an annular groove in the gyro rotor when in said engaging position.

3. The gyro cage system of claim 1, wherein said clamping means comprises a split ring, a first annular groove on said rotor, a second annular groove on support means for the rotor, and actuating means for selectively biasing said ring into and out of engagement with said grooves.

4. The gyro cage system of claim 3, said preloading means comprising tapered teeth on said ring for engaging said first and second grooves.

5. The gyro cage system of claim 4 wherein said preloading means further includes shim means for altering the position of said first groove relative to said second groove.

6. The gyro caging system of claim 3 wherein said actuating means comprises a linear fluid motor.

7. A gyroscope device comprising:
   a rotor,
   a gimbal for supporting said rotor for rotation about its spin axis;
   means including a support post for supporting said gimbal for pivotal movement about an axis perpendicular to said spin axis;
   a base for mounting said support post;
   caging means including an elongated radially movable clamping ring, a first annular groove formed in said rotor, and a second annular groove formed in said base, and said ring includes means for simultaneously engaging said first and second grooves for selectively supporting said rotor substantially independently of its bearing support.

\* \* \* \* \*